United States Patent
Özkütükcü et al.

(10) Patent No.: US 12,281,227 B2
(45) Date of Patent: Apr. 22, 2025

(54) RUBBER COMPOSITION WITH ENHANCED CURING AND ADHESION PROPERTIES, PROCESS FOR ITS PREPARATION, AND ENGINEERED RUBBER PRODUCTS MADE THEREFROM

(71) Applicant: L. Brüggemann GmbH & Co. KG, Heilbronn (DE)

(72) Inventors: Ümit Özkütükcü, Heilbronn (DE); Anne Schulz, Flein (DE); Stefan Mark, Bad Rappenau (DE); Ralph Schäfer, Wiesbaden (DE)

(73) Assignees: L. Brüggemann GmbH & Co. KG, Heilbronn (DE); Allnex Germany GmbH, Wiesbaden (DE)

( * ) Notice: Subject to any disclaimer, the term of this patent is extended or adjusted under 35 U.S.C. 154(b) by 0 days.

(21) Appl. No.: 17/283,822

(22) PCT Filed: Dec. 9, 2019

(86) PCT No.: PCT/EP2019/084295
§ 371 (c)(1),
(2) Date: Apr. 8, 2021

(87) PCT Pub. No.: WO2020/074751
PCT Pub. Date: Apr. 16, 2020

(65) Prior Publication Data
US 2021/0388184 A1  Dec. 16, 2021

(30) Foreign Application Priority Data
Sep. 12, 2019 (EP) .................. 18199042.5

(51) Int. Cl.
*C08L 7/00* (2006.01)
*C08J 3/22* (2006.01)

(52) U.S. Cl.
CPC ............. *C08L 7/00* (2013.01); *C08J 3/226* (2013.01); *C08L 2205/03* (2013.01); *C08L 2310/00* (2013.01); *C08L 2312/00* (2013.01)

(58) Field of Classification Search
CPC .... C08L 7/00; C08L 2205/03; C08L 2310/00; C08L 2312/00; C08J 3/226; C08K 3/36
See application file for complete search history.

(56) References Cited

U.S. PATENT DOCUMENTS

| 7,959,530 B2 | 6/2011 | Grussel et al. |
| 2017/0292014 A1 | 10/2017 | Kitahara et al. |

FOREIGN PATENT DOCUMENTS

| DE | 3900243 A | * 7/1990 | ............. B01D 53/48 |
| EP | 2253649 A1 | 11/2010 | |
| EP | 2432810 A1 | 3/2012 | |
| EP | 3255090 A1 | 12/2017 | |
| WO | 2010/133622 A1 | 11/2010 | |

OTHER PUBLICATIONS

English Machine Translation of DE3900243 (A1) obtained on Nov. 24, 2023 from https://worldwide.espacenet.com/publicationDetails/biblio?CC=DE&NR=3900243A1&KC=A1&FT=D&ND=3&date=19900712&DB=&locale=en_EP (Year: 1990).*
Seido Chemical Industry Co., LTD, Datasheet of Active Zinc Oxide https://web.archive.org/web/20160911162731/http://www.seido-chem.co.jp/products_e/azo.html (Year: 2016).*
International Search Report and Written Opinion received for PCT Patent Application No. PCT/EP2019/084295, mailed on Mar. 3, 2020, 8 pages.

* cited by examiner

*Primary Examiner* — Ling Siu Choi
*Assistant Examiner* — Olga Lucia Donahue
(74) *Attorney, Agent, or Firm* — Faegre Drinker Biddle & Reath LLP

(57) ABSTRACT

The invention relates to a rubber composition with enhanced curing and adhesion properties, comprising the following ingredients: R1—an elastomer or rubber E which is preferably a diene-based elastomer, R2—a particulate active filler which is preferably carbon black, or silica, or a combination of both, R3—a cobalt free curing or crosslinking or vulcanising system which includes sulphur, an active zinc composition ZnX having a specific surface area of from 10 $m^2$/g to 100 $m^2$/g, and accelerators, R4—a novolak composition NC which is a mixture of a novolak resin PA and a urethane-aldehyde resin UA', and R5—a methylene donor, to a process to cure these rubber compositions, and to a method of use of these rubber compositions in engineered rubber products selected from the group consisting of hoses, pressure hoses, conveyor belts, gaskets, and tyres.

10 Claims, No Drawings

RUBBER COMPOSITION WITH ENHANCED CURING AND ADHESION PROPERTIES, PROCESS FOR ITS PREPARATION, AND ENGINEERED RUBBER PRODUCTS MADE THEREFROM

CROSS-REFERENCE TO RELATED APPLICATIONS

This application is a national stage application (under 35 U.S.C. § 371) of PCT/EP2019/084295, filed Dec. 9, 2019, which claims benefit of European Application No. 18199042.5, filed Oct. 8, 2018, both of which are incorporated herein by reference in their entirety.

FIELD OF THE INVENTION

This invention relates to a rubber composition with enhanced curing and adhesion properties, comprising as ingredients a diene-based elastomer and an adhesion enhancement agent, and additionally at least one of a reinforcing agent, a filler, a vulcanising agent, a curing agent, and further additives, to a process for its preparation, and to engineered rubber products made therefrom.

BACKGROUND OF THE INVENTION

In the preparation of engineered rubber products, such as conveyor belts, (pressure) hoses, gaskets, and particularly of tyres, compositions of rubber are often used which include reinforcement fibres, also referred to as "cord", in the form of fabrics or layers of cord. In automotive tyres, steel cord made from steel wire is predominantly used in the tread section of the tyre, often in combination with polyamide (nylon) fabric. Other cord materials are polyester fibres, and fibres from spun cellulose ("rayon"), also in the form of mixtures with other fibres.

The rubber-containing compositions comprise, as usual ingredients, a diene-based elastomer, and at least one each of a reinforcing agent, a filler, a vulcanising agent, a curing agent, an accelerator, an adhesion enhancement agent, and further additives. An adhesion enhancement agent in combination with an active zinc composition is a mandatory ingredient of the rubber-containing compositions according to the invention.

For the purpose of this invention, a chemical compound, also referred to as "compound", is a material comprising at least two atoms of the same or of different chemical elements. As an example, oxygen can exist in atomic form, i.e. of monoatomic O molecules which are highly reactive, and which are unstable under normal (ambient) conditions, and which either react with other materials under formation of oxides, or combine with another oxygen atom to form an oxygen molecule, or in the form of a diatomic molecule $O_2$, which is a stable form, or in the form of a triatomic molecule, $O_3$, which is called "ozone" and which is also highly reactive. Other chemical compounds comprise two or more different elements, such as $H_2O$ which consists of molecules having each two hydrogen atoms H, and one oxygen atom O, or $H_2SO_4$ (sulfuric acid) which consists of molecules wherein two hydrogen atoms, one sulfur atom, and four oxygen atoms are comprised.

For the purpose of this invention, a composition is a mixture of at least two different ingredients, individually also referred to as components of the composition. An example is aqueously diluted sulfuric acid which has two main components, viz., water $H_2O$, and sulfuric acid $H_2SO_4$, and also hydrogen ions, $H^+$, and acid anions, $HSO_4^-$, and $SO_4^{2-}$, and hydrated forms of these ions such as hydronium $H_3O^+$ ion. Other compositions are rubber compositions comprising natural or synthetic rubber, and mixtures thereof, fillers, particularly carbon black, and additives such as vulcanising agents. In the technical literature, the term "rubber compound" is frequently used when a rubber composition is meant.

For the purpose of this invention, a composite is a solid material that usually comprises more than one phase which phases can be mono-component phases or multi-component phases, in most cases with a continuous first phase of a first material usually referred to as "matrix" and a dispersed second phase comprising a second material that modifies the physical properties of the matrix phase, which second material can be, i. a., a filler (modifying, i. a., the hardness, the density, the electrical or thermal conductivity), a reinforcing agent (increasing, i. a., the tensile, bending, or compression moduli and strengths), a toughening agent (increasing, i. a., the elasticity, the elongation at break, the impact resistance), or a colouring agent (modifying the optical transmission, reflection, and scattering, such as colourants and pigments). Composites play a major role in man-made materials such as fibre-reinforced thermoplastic or thermoset materials, fibre-reinforced ceramic materials, where the fibres may be made from metals, from organic thermoplastic materials such as polyesters and polyamides, from organic non-meltable materials such as aramid fibres, polyacrylonitrile fibres, from inorganic materials such as metal or ceramic fibres, metal wire, and metal or ceramic whiskers, glass fibres, carbon fibres, boron nitride fibres, wollastonite, and rock wool. The matrix materials include thermoplastic and thermoset polymers, rubber and rubber mixtures, metals and alloys, ceramic matrices, and concrete.

In the preparation of an engineered rubber product which is a composite, the continuous phase of the composite is the (cured or vulcanised) rubber, and reinforcing fibres and also fillers form the dispersed or discontinuous phase.

PRIOR ART

The patent application EP 3255090 A1 relates to a rubber composition, to a process for the preparation thereof, to a crosslinked rubber composition, and tyres made therefrom, see paragraph [0001] thereof. A zinc oxide is used in this composition, wherein the volume fraction of zinc oxide aggregates with a diameter of 20 µm or more is 0.008 (0.8%) or less in the rubber composition, see claim 1 and paragraph [0009]; in claim 2, the upper limit of the volume fraction is 0.007 (0.7%). The rubber composition further comprises carbon black having an average areic amount of acidic functional groups of from 0.15 µmol/m² up to less than 3.00 µmol/m²; see claim 3 and paragraph [0014]. The crosslinked rubber composition of this application which is formed by crosslinking the aforementioned rubber composition has a crosslink density of 4.53×10⁻⁴ mol/cm³ or less; see claim 5 and paragraph [0016]. The rubber composition is prepared by first preparing a wet masterbatch using carbon black with an average areic amount of acidic functional groups of from 0.15 µmol/m² or more and less than 3.00 µmol/m²; and then compounding a zinc oxide with the wet masterbatch, see claim 7 and paragraph [0019]. Finally, a tyre is claimed in claim 9, and described in paragraphs [0021], [0022], and [0073] to [0074]. There is no information in this application about the specific surface area of the zinc oxide used.

In the patent application US 2017/292014 A1, a chloroprene rubber composition is disclosed where an "active zinc white" is mentioned as vulcanisation accelerator, having an average particle diameter of from 0.05 μm up to 0.35 μm, a range of particle sizes from 0.01 μm up to 1.0 μm, and a specific surface of from 10 m$^2$/g up to 150 m$^2$/g; see claim 1.

In the patent document U.S. Pat. No. 7,959,530 B2, a drive belt is disclosed which is made from a radically crosslinked rubber mixture, which mixture comprises (a) at least one carboxyl group-containing carboxylic acid, which is at least alpha, beta-unsaturated and gamma, delta-unsaturated, in a ratio 100×m$_a$/m$_R$, of the mass m$_a$ of component (a) to the mass m$_R$ of all rubber components in the mixture, of from 0.1 to 50 (this ratio often being designated in rubber technology as "phr") and (b) as co-activator, at least one salt-former which is a metal-containing compound reactive with such carboxyl groups of the acids (a) to form salt bridges therebetween, in a ratio 100×m$_b$/m$_R$, of the mass m$_b$ of component (b) to the mass m$_R$ of all rubber components in the mixture, of from 0.1 to 50, wherein the rubber mixture contains at least one of an ethylene-propylene-diene rubber (EPDM), ethylenepropylene rubber (EPM) or hydrogenated nitrile rubber. The said at least one salt-former is a metal oxide or a metal carbonate, preferably a zinc compound, and particularly preferably, zinc oxide. In col. 3, lines 38 to 53, it is taught to be advantageous to use active zinc oxide. Active zinc oxide has a large specific surface. While standard zinc oxides or "zinkweiss" have BET surface areas of up to 10 m$^2$/g, the BET surface areas in active zinc oxides lie at or above 20 m$^2$/g. Active zinc oxides can be procured for example, under the designation "zinc oxide active" from the LANXESS Company (having a BET surface area of about 45 m$^2$/g).

In the journal "Rubber Chemistry and Technology" July 1979, Vol. 52, No. 3, pp. 605 to 675, by W. J. van Oooji, a survey of the state of the art was given relating to rubber adhesion on steel tyre cords, particularly brass-plated steel cords, in rubber composites. It had been found that the brass surface is chemically attacked under formation of zinc oxide, and copper and zinc sulfides. These products become an integral part of the rubber-to-metal bond. It has been demonstrated that excessive or insufficient bond formation both lead to a lowered rubber-brass bond strength. The rubber-brass bond was interpreted as an adhesion of sulphur crosslinks to a sulfidised brass surface. Even for relatively weak bonds between sulphur crosslinks and sulfidised brass surfaces, the adhesion strength between rubber and brass exceeds the rubber tear strength. As a result, the contact area of the two phases is significantly enlarged. Best adhesion results have been obtained if the brass surface consists completely of cuprous sulfide, although there is evidence that a zinc sulfide surface can also be bonded well, provided the growth of the zinc sulfide layer is high enough to provide a sufficient number of points of attachment to the polysulfide crosslinks.

This theory has been further developed as published by W. J. van Ooij in "Rubber Chemistry and Technology", July 1984, Vol. 57, No. 3, pp. 421 to 456. A model is described therein in which most of the recent findings have been incorporated. In this model, brass develops a high bond strength to NR (Natural Rubber) as a result of the in-situ growth of a thin (thickness 50 nm) copper sulfide film onto the brass during the early stages of the cure before crosslinking sets in. This sulfide film has good adhesive and cohesive properties but is, on the other hand, so porous that rubber molecules become entangled in this film (interlocking model). ZnS or FeS are considered nonbonding because they lack the microporosity required for interlocking. Synchronisation of sulfide growth and rubber cure is not required. The major prerequisite is that sulfide film growth has been completed before crosslinking begins. Ultimate bond strength and bond durability are determined by the nature of the cord and by the properties of the rubber composition. Optimum cord parameters are predicted by the model as a thin brass coating on the steel cord, with a high concentration of diffused iron, a low copper content (a mass fraction of from 60% to 65%) and a thin but very homogeneous surface layer of zinc oxide which is passivating the steel, and which contains copper atoms. Copper oxides are undesirable. The homogeneous ZnO film improves the corrosion resistance of the steel cord, the included Cu atoms are required for rapid initial copper sulfide formation and prevention of formation of non-bonding ZnS deposits. The major compound parameter is the sulphur-to-accelerator ratio.

A recent survey by William J. Vanooij, Prasan B. Harakuni, and Guy Buytaert "Adhesion of Steel Tyre Cord to Rubber" has been published in "Rubber Chemistry and Technology", July 2009, Vol. 82, No. 3, pp. 315 to 339. This paper reviews the literature on rubber-brass bonding that has been published in the last decade. Emphasis in this review is on those papers that have contributed to an increased understanding of the mechanisms of rubber-brass bonding as it is of importance to the performance of brass-plated steel tyre cords. The papers dealing with adhesion between rubber and steel tyre cord can conveniently be divided into three categories: (i) the effect of silica on steel cord adhesion, (ii) adhesion promotors (cobalt-containing or others) and (iii) the effect of resins of the standard hexamethoxymethyl melamine (HMMM) resin and resorcinol-formaldehyde resin type.

OBJECT OF THE INVENTION

Cobalt compounds present in the rubber composition, and also resorcinol-based resins which are used together with steel cord, and also in dip solutions for textile reinforcing fibres, present toxicity problems in manufacturing. It has therefore been an object of the invention to provide an adhesion enhancement agent which is free from cobalt compounds and from resorcinol or resorcinol-based resins, with vulcanisation speed and cord adhesion at least on par with present-day systems.

SUMMARY OF THE INVENTION

The compositions according to this invention which are free or substantially free from cobalt compounds, and from resorcinol or resorcinol-based resins are particularly useful for steel cord reinforced rubber composites. Therefore, this invention also relates to a process to increase the adhesion of steel cord to a rubber matrix in reinforced rubber composites. It further relates to a method of reducing the mass fraction of resorcinol and chemical compounds containing resorcinol or resorcinol derivatives, and to a method of reducing the mass fraction of cobalt and chemical compounds containing cobalt, in rubber-containing compositions used to prepare steel-cord reinforced rubber composites, below a desired maximum level.

It has been found, in the experiments underlying the present invention, that the use of a combination of an active zinc composition ZnX and a novolak resin composition which is a mixture of a novolak resin and a urethane-aldehyde resin in the preparation of a rubber composition leads to improved vulcanisation properties and to good adhesion between the rubber matrix and fibre or steel wire reinforcing agents, and does away with the need to add resorcinol either in the form of a resorcinol-based resin or in the form of resorcinol itself, or to add cobalt salts to the rubber composition, while maintaining the level of adhesion between steel wire reinforcement and the rubber matrix which has been known from rubber compositions comprising resorcinol or resorcinol-based resins and cobalt salt or cobalt-coated steel wire. As both cobalt and cobalt salts, on one side, and resorcinol, or resorcinol-based resins on the other side, are deemed to be problematic from an ESH (environmental safety and health) point of view, such improvement is deemed to be attractive.

The active zinc composition ZnX as used in this invention is in powder form, or in a masterbatch form incorporated in a polymeric matrix and has a specific surface area in the powder form of from 10 $m^2/g$ to 100 $m^2/g$, preferably from 20 $m^2/g$ to 65 $m^2/g$ and is prepared by precipitation of zinc carbonate and/or zinc hydroxide from a solution, and subsequent calcination, in the so-called wet process. This active zinc composition ZnX in combination with the novolak resin composition leads to markedly improved vulcanisation or crosslinking, and also to improved adhesion properties particularly on steel wire vis-à-vis the standard French Process zinc oxide. The polymeric rubber matrix is chosen from the class of polyolefins, polyolefin copolymers with dienes, acrylates, esters and anhydrides of olefinically unsaturated acids, copolymerisable acetates of olefinically unsaturated acids, acrylonitrile, and polyesters, phenolic resins and amino resins, synthetic and natural rubber compounds, e.g. polyisoprene (IR), butadiene rubber (BR), styrene-butadiene rubber (SBR), ethylene-propylene diene rubber (EPDM), butylrubber (IIR), chloroprene rubber (CR), acrylonitrile butadiene rubber (NBR), all of the preceding rubber types being diene-based elastomers, polyurethane rubbers (polyesterurethane AU), polyetherurethane (EU), alkyl-acrylate copolymer rubber (ACM), hydrogenated acrylonitrile butadiene rubber (HNBR), chlorosulphonated polyethylene (CSM), vinylmethyl silicone rubber (VMQ), and phenylmethyl silicone rubber (PMQ). The mass fraction w(ZnX) of active zinc composition ZnX in the masterbatch is from 5% to 80%, based on the mass of the masterbatch; preferably, w(ZnX) is from 10% to 75%, and particularly preferred, from 20% to 70%.

The novolak resin composition is a mixture of a novolak resin and a urethane-aldehyde resin, preferably such as described in EP 2432810 B1, Example 1, by preparing a novolak from phenol and formaldehyde in the presence of a urethane formaldehyde resin. The mass fraction of the urethane formaldehyde resin in the mixture thus prepared was 11%.

DETAILED DISCLOSURE OF THE PREFERRED EMBODIMENTS

The rubber compositions according to the present invention are based on elastomeric materials, or rubbers, and are usually selected from the group consisting of natural rubber (NR) which is mostly produced from the Para rubber tree, Hevea Brasiliensis, and is originally a latex comprising water and a polymer derived from isoprene, together with minor impurities of other organic compounds; and synthetic rubbers, the best known of which are synthetic polyisoprene (IR), butadiene rubber (BR), styrene-butadiene rubber (SBR), ethylene-propylene diene rubber (EPDM), butylrubber (IIR), chloroprene rubber (CR), acrylonitrile butadiene rubber (NBR), all of the preceding rubber types being diene-based elastomers, polyurethane rubbers (polyesterurethane AU), polyetherurethane (EU), alkyl-acrylate copolymer rubber (ACM), hydrogenated acrylonitrile butadiene rubber (HNBR), chlorosulphonated polyethylene (CSM), vinylmethyl silicone rubber (VMQ), and phenylmethyl silicone rubber (PMQ). Mixtures of these different elastomeric materials can also be used. Among these, NR, IR, BR, EPDM, IIR, CR, NBR, and SBR are mostly vulcanised, or cured, with sulphur. For engineered rubber products, particularly for tyres, SBR is mostly used.

Sulphur if used alone is a slow vulcanising agent and is only used for elastomeric materials having olefinic unsaturation. Vulcanisation accelerators have to be used which need to be tailored to the rubber type and intended end use. Usually, a large number of diverse additives, comprising the so-called "cure package," are necessary. The combined cure package in a typical rubber composition consists of sulphur together with an assortment of compounds that modify the kinetics of crosslinking and stabilise (protect) the final product. These additives include accelerators for vulcanising, activators for vulcanising like zinc oxide and stearic acid, softeners such as petroleum oil, pine tar, resins, and waxes as processing aids, and for tack improvement, and antidegradants such as waxes, antiozonants, and antioxydants to protect the tyres against heat and against oxydation. The accelerators and activators are catalysts. Retarding agents that inhibit vulcanisation until some optimal time or temperature have been reached are also used. Antidegradants are used to prevent ageing and degradation of the vulcanised product by heat, oxygen, and ozone. All these chemicals and additives are also commonly referred to as "rubber chemicals".

The addition of zinc oxide (ZnO) as an activator for the sulphur vulcanisation of rubbers enhances the vulcanisation efficiency and vulcanisate properties and reduces the vulcanisation time. The curing and physical properties found with the standard quality ZnO ("Red Seal", mass fraction of ZnO is more than 99.5%, specific surface area≈4.5 $m^2/g$) can be retained with a reduced level of an active zinc composition ZnX according to the invention down to 1 phr or 2 phr.

In rubber compounding, it has become common to specify the amount of each individual added component (additive mixtures, chemical compounds, fillers, reinforcing fibres etc.) by their relative mass $(m_C/m_{Elastomer}) \times 100$, $m_C$ being the mass of an individual added component, and $m_{Elastomer}$ being the sum of masses of all elastomeric components in the mixture, and use the designation "phr" as a unit.

Zinc oxide varieties used in rubber compounding are the so-called thermal zinc oxide grades, one of them being the "Red Seal" grade mentioned supra, that are made synthetically by oxydation of vapour of metallic zinc, either by the so-called French or indirect process which starts from (purified) metallic zinc which is vaporised, and then oxydised, or the so-called American or direct process which starts from zinc ores or smelter by-products which are reduced in a carbothermal reduction by heating with a source of carbon such as anthracite to produce zinc vapour, which is then oxidised as in the indirect process. Because of the lower purity of the source material, the final product is also of lower quality in the direct process as compared to the indirect process.

A process that leads to a material having a higher specific surface area is a wet chemical process where aqueous solutions of zinc salts are treated with a soluble base or soluble carbonate salts from which zinc carbonate or zinc hydroxide is precipitated, followed by separation of the precipitate and a controlled and gentle drying step referred to as "calcination" in the context of this invention. This calcination step is preferably conducted by spray drying or contact drying, and preferably at a temperature of from 150° C. to 400° C. The zinc compositions thus obtained comprise one or more zinc compounds, viz., at least one of oxides, hydroxides, carbonates and basic carbonates of zinc as constituents which have an average composition according to the general formula $Zn\,O_y\,(OH)_z\,(CO_3)_v$ and are referred to as "active zinc composition ZnX" in the context of this invention, with specific surface areas from 10 m²/g to 100 m²/g, preferably from 20 m²/g to 65 m²/g. In the active zinc composition ZnX according to the invention, the indexes x, y, z, and v are integer and non-integer numbers in the following ranges: x=1 to 6, y=0 to 5, z'=0 to 6, and v=0 to 5, with the requirement that at least one of y, z and v is greater than zero. It goes without saying that the values for x, y, z, and v have to be chosen in a way that the valences of zinc cations on one side, and those of the anions oxide, hydroxide, and carbonate must be stoichiometrically balanced, i.e. their sum $2 \times x - 2 \times y - z - 2 \times v$ must be zero.

According to the invention, the use of the active zinc composition ZnX together with an adhesion enhancement additive which is a novolak resin composition leads to rubber compounds which do not need the presence of additional cobalt compounds in the rubber compounds during curing, but cure as fast or faster as a cobalt compound-containing rubber compositions and have the same level of adhesion of rubber to the brass-plated steel wire used for reinforcing of rubber compounds for applications in engineered rubber products, including tyres, hoses, gaskets, and conveyor belts, and also does not need the presence of resorcinol alone or in the form of resorcinol-aldehyde resins.

Cobalt (Co) and its compounds are widely distributed in nature and are part of numerous anthropogenic activities. Although cobalt has a biologically necessary role, e. g., as metal constituent of vitamin B12, excessive exposure has been shown to induce various adverse health effects. See the review of L. Leyssens et al, "Cobalt toxicity in humans-A review of the potential sources and systemic health effects" in Toxicology 2017, Volume 387, 15 Jul. 2017, pages 43 to 56.

Cobalt is usually used in rubber compounding in the form of its lipophilic salts, such as salts of fatty acids, of naphthenic acids (a mixture of acidic fractions originally present in crude oil, and also formed during refining and oxydation steps, which are mostly cycloaliphatic monocarboxylic acids having cyclopentyl and cyclohexyl structures, and a molar mass of from 120 g/mol to about 700 g/mol), of isooctanoic acid (2-ethylhexanoic acid), or of neodecanoic acid (a highly alpha-branched aliphatic monocarboxylic acid) having a mass fraction of cobalt metal ions of up to (20.5±0.5) %.

Rubber compositions for the preparation of engineered rubber products further comprise fillers that include active or reinforcing fillers such as carbon black or silica, or a combination of both, which active fillers increase hardness, stiffness (modulus), strength, tear resistance, and abrasion resistance.

The rubber compositions according to the invention therefore have the following essential ingredients:
R1 an elastomer or rubber E which is preferably a diene-based elastomer,
R2 a particulate active filler which is preferably carbon black, or silica, or a combination of both,
R3 a cobalt free curing or crosslinking or vulcanising system which includes sulphur, an active zinc composition ZnX having a specific surface area of from 10 m²/g to 100 m²/g, and accelerators,
R4 a reinforcing resin which comprises a novolak resin composition that is preferably resorcinol free, and
R5 a methylene donor.

The term "cobalt-free" as used in this application means that the ratio $100 \times m(Co)/m(E)$ of the mass m(Co) of cobalt to the mass m(E) of elastomers E in the rubber composition is less than 0.001 kg/100 kg (0.001 phr). Preferably, this ratio is below the detection limit. It is particularly preferred to use no cobalt compounds at all in the rubber compositions according to this invention.

The term "resorcinol-free" as used in this application means that the ratio $100 \times m(Res)/m(E)$ of the mass m(Res) of resorcinol present as free compound is less than 0.001 kg/100 kg (0.001 phr), and less than 0.005 kg/100 kg (0.005 phr) for bound resorcinol in resorcinol derived resins. Preferably, this ratio is below the detection limit. It is particularly preferred to use no resorcinol at all, and also no resorcinol derived resins in the rubber compositions according to this invention.

The elastomer R1 is preferably selected from the diene-based elastomers natural rubber NR, synthetic polyisoprene IR, butadiene rubber BR, and styrene-butadiene rubber SBR. These elastomers are usually cured with sulphur, and accelerators which are described below in more detail.

The particulate filler R2 can be chosen from a variety of fillers which are usually classified by their (average) particle size, as degradative fillers (from ca. 7 μm to ca. 100 μm, grinded calcium carbonate, mica, talc), dilution fillers (1 μm to 7 μm, mica, talc, clays), semi-reinforcing fillers (100 nm to 1 μm, precipitated calcium carbonate, $TiO_2$, ZnO, carbon black), and reinforcing fillers (10 nm to 100 nm, carbon black, silica aluminates, hydrated and anhydrous silica). For engineered rubber products, such as hoses, pressure hoses, gaskets, and tyres, particularly tyres, which need elasticity, stiffness, rebound resilience, and low abrasion, semi-reinforcing and reinforcing fillers are preferably used, mainly, carbon black and silica grades. Mixtures of these fillers can also be used.

The curing or crosslinking or vulcanising system R3 comprises a principal vulcanising agent, such as sulphur, peroxides, or metal oxides for some halogenated rubber types. Sulphur is mainly used for diene-based elastomers, other vulcanising agents therefor are phenolic resins, quinone derivates, and maleimides. Peroxides can also be used for these diene-based rubber types, but they are used particularly for those rubber types where no olefinic unsaturation remains in the polymer, such as silicone rubbers, ethylene-propylene rubbers, acrylate rubbers, and urethane rubbers. As sulphur itself is a slow vulcanising agent, it is generally used together with accelerators which comprise the families of thiazoles and sulfenamides (also referred to as "Primary Accelerators") which provide good processing safety, a broad vulcanisation plateau, and optimum crosslink density, as well as desired reversion delay, and also basic accelerators such as amine-aldehyde adducts, guanidines, thiurams, thioureas, and dithiocarbamates (also referred to as "Secondary Accelerators") which are used to activate the Primary Accelerators. The use of Secondary Accelerators increases the speed of vulcanisation substantially, but at the expense of scorch safety. Dosage of the Primary Accelerators is from $0.5 \leq 100 \times m_{PA}/m_{R1} \leq 1.5$ in most rubber compounds (from 0.5 phr to 1.5 phr), where $m_{R1}$ is the mass of the elastomer component R1, and $m_{PA}$ is the mass of Primary Accelerator. The dosages of the Secondary Accelerators are generally in a range of $10\% \leq m_{SA}/m_{PA} \leq 40\%$, where $m_{SA}$ is the mass of Secondary Accelerator.

Useful Primary Accelerators are the thiazoles MBT (2-mercaptobenzothiazole), MBTS (2-2'-dithiobis[benzothiazole]), and ZMBT (zinc-2-mercaptobenzothiazole), and the sulfen-amides CBS (N-cyclohexyl-2-benzothiazole sulfenamide), TBBS (N-tert-butyl-2-benzothiazole sulfenamide), MBS (2-[4-morpholinothio]-benzothiazole) and DCBS (N,N'-dicyclo-hexyl-2-benzothiazole sulfenamide). Useful Secondary Accelerators are the aldehyde-amine adducts hexamethylene tetramine (HMT), heptaldehyde-aniline adduct (BA), the guanidines diphenyl guanidine (DPG), N, N'-diorthotolyl guanidine (DOTG), the thioureas ethylene thiourea (ETU), di-pentamethylene thiourea (DPTU), dibutylthiourea (DBTU), the thiurams tetramethylthiuram monosulfide (TMTM), tetramethylthiuram disulfide (TMTD), dipenta-methylenethiuram tetrasulfide (DPTT), and tetrabenzylthiuram disulfide (TBzTD), the dithiocarbamates zinc dimethyldithiocarbamate (ZDMC), zinc diethyldithiocarbamate (ZDEC), zinc dibutyldithiocarbamate (ZDBC), zinc dibenzyldithiocarbamate (ZDBC), and the xanthate zinc-isopropylxanthate (ZIX).

Zinc oxide is typically used together with sulphur as vulcanising agent in the crosslinking system R3, and the efficiency of zinc in combination with accelerators is often enhanced by the presence of lipophilic acids such as stearic acid.

According to the invention, the so-called active zinc composition ZnX is used as a mandatory constituent of R3 which is preferably made in a wet process, and which has a specific surface area of at least 10 m$^2$/g. The ratio m(ZnX)/$m_{R1}$ of the mass m(ZnX) of the active zinc composition ZnX in the rubber composition to the mass $m_{R1}$ of the elastomer component R1 is preferably from 0.1 kg/(100 kg) [0.1 phr] to 10 kg/(100 kg) [10 phr], preferably from 0.2 phr to 9 phr, and particularly preferred, from 0.4 phr to 8 phr.

The reinforcing and adhesion-enhancing resin component R4 serves to increase certain mechanical properties of the rubber compound, particularly tensile strength, hardness, and abrasion resistance which are important for engineered rubber goods and tyres and the adhesion to the reinforcing cord. This component comprises a novolak composition NC, together with a methylene donor R5 which is preferably selected from the group consisting of hexamethylene tetramine, and hexamethoxymethyl melamine.

According to the invention, a novolak composition NC which is a mixture of a novolak resin PA and a urethane-aldehyde resin UA' is used together with a methylene donor, which mixture of a novolak resin PA and a urethane-aldehyde resin UA' is also referred to as a reinforcing resin or adhesion-enhancing resin, and with special preference, a novolak composition NC wherein the novolak resin PA has been synthesised in the presence of a preformed urethane-aldehyde resin UA' as disclosed in EP 2432810 B1. These mixtures act as reinforcing resins, together with a methylene donor, and also as adhesion enhancers to both fibre cord and metal wire cord in a cord-reinforced rubber product.

The novolak resin PA is preferably based on a phenol P which is an aromatic compound having at least one hydroxyl group bound to an aromatic nucleus, and has at least one reactive hydrogen atom in ortho- or para-position to the phenolic hydroxyl group, the aromatic compound being mononuclear, or polynuclear, i.e. having more than one aromatic nucleus annealed or bound by a direct bond or a divalent group. Examples are phenol itself, alkylphenols such as o-, m-, or p-cresol, 2,4-xylenol, 2,6-xylenol, ethylphenols, and also longer chain alkyl phenols such as 4-tert-butylphenol, 4-isooctylphenol, 4-nonyl phenol, 4-octadecyl-o-cresol, or cardanol (a mixture of $C_{15}$-alk(en) ylphenols made by decarboxylation of anacardic acid which is obtained from cashew nutshell liquid, of general formula $C_{21}H_{36-n}O$, where n is mostly 0, 2, 4, or 6), and also divalent hydroxyaromatics such as resorcinol and bisphenol A. Mixtures of these phenols P can also be used. Preferred is phenol itself, and mixtures of phenol with cresols and other alkylphenols having one phenolic hydroxyl group. These phenols P are reacted with aldehydes A, preferably formaldehyde or compounds that liberate formaldehyde under heating, in the presence of acidic catalysts, to form a novolak resin PA.

The urethane-aldehyde resin UA' is usually based on aliphatic urethanes U such as ethylurethane, butylurethane, and hexylurethane, preferably butylurethane and hexylurethane, and aliphatic aldehydes A' having from one to four carbon atoms which are formaldehyde, acetaldehyde, propionaldehyde, and butyraldehyde, preferably formaldehyde.

The mass fraction w(UA') of urethane resins in the mixture of UA' and PA, or in the product PAUA' obtained by preparing a novolak resin from a phenol P and an aldehyde A as defined hereinbefore, in the presence of a preformed urethane-aldehyde resin UA', which is the ratio of the mass m(UA') of the urethane-aldehyde resin and the sum m(PA)+m(UA') of the mass m(PA) of the novolak and the mass m(UA') of the urethane aldehyde resin $$w(UA')=m(UA')/[m(PA)+m(UA')]$$

is preferably between 0.05 kg/kg and 0.5 kg/kg, or between 5% and 50%.

It has been found in the experiments underlying this invention that the use of a novolak composition NC which is a urethane-aldehyde resin-modified novolak resin PAUA', or a mixture of a novolak resin PA and a urethane-aldehyde resin UA', as component in the rubber compounding process, together with the active zinc composition ZnX having a specific surface area of at least 10 m$^2$/g makes it possible to reduce the amount of cobalt compounds needed to obtain sufficient adhesion of a rubber composition made with this mixture to steel wire and brass-plated steel wire, to a ratio (100×m(Co))/m(E) of the mass m(Co) of cobalt to the mass m(E) of elastomers E in the rubber composition to a value of less than 0.001 kg/100 kg (0.001 phr), or to completely eliminate the addition of cobalt salts. It has even been found in the experiments that addition of cobalt salts (particularly cobalt stearate) to rubber compositions which comprise the same mass fractions of a urethane-aldehyde resin-modified novolak resin PAUA' (or a mixture of a novolak resin PA and a urethane-aldehyde resin UA') and the active zinc composition ZnX reduces the values obtained for the maximum S'$_{max}$ of elastic stress S' and of rate of increase in elastic stress ΔS'/Δt, determined here as the ratio of difference ΔS' in elastic stress between 20% and 80% of the maximum value S'$_{max}$, and the time interval Δt needed to increase the elastic stress from 20% of the maximum value S'$_{max}$ to 80% of the maximum value S'$_{max}$, during vulcanisation as monitored in a moving die rheometer.

The ratio $w_{ra}$=m(UA',PA)/m(R1) of the mass m(UA',PA) of the mixture of UA' and PA which is the sum m(PA)+m(UA') to the mass m(R1) of the elastomer or rubber R1 present in the rubber composition, or the ratio $w_{rb}$=m(PAUA')/m(R1) of the mass m(PAUA') of product PAUA' obtained by preparing a novolak resin from a phenol P and an aldehyde A as defined hereinbefore, to the mass m(R1) of the elastomer or rubber R1 present in the rubber composition is preferably:

0.005 kg/kg≤$w_{ra}$≤0.050 kg/kg, or 0.5 kg/(100 kg)≤$w_{ra}$≤5.0 kg/(100 kg), and 0.005 kg/kg≤$w_{rb}$ 0.050 kg/kg, or 0.5 kg/(100 kg)≤$w_{rb}$≤5.0 kg/(100 kg).

In a preferred embodiment, the limits of these intervals can be from 1 kg/(100 kg) to 4 kg/(100 kg), and particularly preferred, from 1.5 kg/(100 kg) to 3.5 kg/(100 kg).

It is also possible by using the novolak composition NC according to the invention to reduce the amount of resorcinol in the rubber composition, expressed as the ratio (100× m(Res))/m(E) of the mass m(Res) of resorcinol present as free compound or in the form of a resorcinol-aldehyde resin to the mass m(E) of elastomers E in the rubber composition to a value of less than 0.001 kg/100 kg (0.001 phr) for free resorcinol, and to less that 0.005 kg/100 kg (0.005 phr) for bound resorcinol in resorcinol derived resins. It is particularly preferred to use no resorcinol at all, and also no resorcinol derived resins.

It has further been found that there is no adverse effect on the steel cord adhesion of the formulations according to the present invention which are free from cobalt or have a ratio of the mass of cobalt to the mass of elastomers in the rubber composition of less than 0.001 kg/100 kg (0.001 phr).

EXAMPLES

The following examples are intended to illustrate the invention without limiting the scope thereof.

Example 1 Base Rubber Mixture

A base rubber mixture was prepared in a kneader at 140° C. from the following constituents: 5 kg of natural rubber (SMR rubber grade CV50 having a mass fraction of ashes of below 0.50%, a plasticity retention index of at least 60% after ageing at 140° C. for thirty minutes, and a Mooney Viscosity ML 1+4 at 100° C. of 50±5); 2.75 kg of carbon black N326 grade (having a specific iodine adsorption of (82±5) g/kg, measured according to ASTM D1510, a specific oil absorption of (72±5) cm³/(100 g), measured according to ASTM D2414, and a pour density of (440±30) kg/m³); 0.1 kg of stearic acid in pellet form (Palmera B 1805 from Avokal GmbH, iodine number max. 5 g/hg), and 0.75 kg of precipitated silica (®Ultrasil VN3, Evonik Resource Efficiency GmbH, having a specific surface of 180 m²/g measured according to ISO 9277, and mass fractions of iron, copper and manganese in the product as follows: w(Fe)≤400 mg/kg, w(Cu)≤6 mg/kg, and w(Mn)≤6 mg/kg).

Example 2 Rubber Compositions

The following further materials (mass in g) were added to separate portions of this base rubber mixture, each of these portions containing exactly 1 kg of natural rubber, during kneading in the sequence of the rows in Table 1:

TABLE 1

Additions to the base rubber mixture
(mass of added substance in g)

| Rubber compound added materials | R01 | R02 | R03 | R04 | R05 |
|---|---|---|---|---|---|
| ZnO Red Seal[1] | 60 | 60 | 60 | | |
| ZnX[2] | | | | 60 | 60 |
| TMQ[3] | 10 | 10 | 10 | 10 | 10 |
| Process Oil[4] | 40 | 40 | 40 | 40 | 40 |
| Co stearate[5] | 7.5 | | 7.5 | | 7.5 |

TABLE 1-continued

Additions to the base rubber mixture
(mass of added substance in g)

| Rubber compound added materials | R01 | R02 | R03 | R04 | R05 |
|---|---|---|---|---|---|
| Resorcinol[6] | 30 | | | | |
| Novolak[7] | | 25 | 25 | 25 | 25 |
| HMMM[8] | 38.5 | 41.5 | 41.5 | 41.5 | 41.5 |
| Sulfur[9] | 60 | 60 | 60 | 60 | 60 |
| DCBS[10] | 6 | 6 | 6 | 6 | 6 |
| TBBS[11] | 9 | 9 | 9 | 9 | 9 |

[1]standard zinc oxide made by the French Process, specific surface area 6.5 m²/g, Numinor Chemical Industries Ltd.

[2]active zinc composition ZnX made by the wet process, specific surface area 45 m²/g.

[3]polymerised 2,2,4-Trimethyl-1,1-dihydroquinoline, CAS# 26780-96-1, Western Reserve Chemical

[4]light coloured naphthenic process oil, wax-free (Sunthene 450, Sunoco Europe)

[5]Ecos ® 9.3 cobalt stearate, mass fraction of Co metal is 9.3%, Umicore Cobalt & Specialty Materials

[6]Resorcinol, industrial grade

[7]prepared in accordance with Example 1 from EP 2 253 649 A1

[8]Hexamethoxymethylmelamine, on a carrier of precipitated silica, mass fraction of HMMM is 65% (Cyrez ® 964 powder concentrate, Allnex USA Inc.)

[9]Crystex ™ HD OT 20, sulphur powder with a particle size of less than 30 μm, with a mass fraction of 20% of oil (hydrotreated heavy naphthenic petroleum distillate, CAS # 64742-52-5)

[10]N,N-Dicyclohexyl-2-benzothiazolesulfenamide; CAS# 4979-32-2

[11]N-tert-butyl-benzothiazole sulfonamide; CAS# 95-31-8

Example 3 Vulcanisation and Properties

From the unvulcanised rubber compositions prepared in Example 2, samples in the form of cylindrical slabs with a volume of 4.5 cm³ were cut with a sample cutter, and these were tested in a moving die rheometer at a temperature of 155° C., with a fixed frequency of 1.67 Hz.

The following characteristic values were calculated from the data obtained:

| | |
|---|---|
| $S'_{max}$ | maximum value of the elastic stress as measured in the moving die rheometer |
| S' (20%) | $S'_{max} \times 0.2$ |
| S' (80%) | $S'_{max} \times 0.8$ |
| t (20%) | the time when S' reaches the value of $S'_{max} \times 0.2$ during the rise of the stress |
| t (80%) | the time when S' reaches the value of $S'_{max} \times 0.8$ during the rise of the stress |
| S' (80%) − S' (20%)/ [t (80%) − t (20%)] | steepness of slope, calculated from the differences of the values supra, as a measure of the rate of increase of the elastic modulus during vulcanisation |

The steps have been chosen to account for the scorch or induction period at the beginning of the vulcanisation process, and to account for reversion or marching. The results for these characteristic values are shown in Table 2.

TABLE 2

Vulcanisation Behaviour of Rubber Compositions R01 to R05

| Rubber Compound | Unit | R01 | R02 | R03 | R04 | R05 |
|---|---|---|---|---|---|---|
| $S'_{max}$ | dN·m | 38.8 | 32.6 | 52.1 | 46.8 | 45.3 |
| S' (20%) | dN·m | 7.8 | 6.5 | 10.4 | 9.4 | 9.1 |
| S' (80%) | dN·m | 31.0 | 26.1 | 41.6 | 37.5 | 36.2 |
| t (20%) | min | 1.4 | 1.8 | 1.6 | 1.5 | 1.3 |
| t (80%) | min | 8.3 | 9.0 | 8.7 | 7.8 | 7.3 |
| S' (80%) − S' (20%)/ [t (80%) − t (20%)] | dN·m/ min | 3.3 | 2.7 | 4.4 | 4.5 | 4.5 |
| Shore D hardness | | 31.3 | 27.8 | 34.5 | 33.9 | 33 |
| Stress at 100% elongation | MPa | 6 | 5.15 | 8.11 | 7.37 | 7.69 |
| Stress at 200% elongation | MPa | 11.09 | 9.31 | Break* | 12.74 | 13.53 |
| POF (TAWI) | N | 290 | 375 | 365 | 380 | 270 |

POF: Pull out force measured on steel cord which was coated with a Cu—Zn—Co ternary alloy
TAWI: steel cord coated with a Cu—Zn—Co ternary alloy
Break: sample broken at an elongation of 150%

It can be seen from this table that both vulcanisation speed (rate of increase of the elastic modulus during vulcanisation) and maximum elastic stress S' when using the system of the invention (Rubber Compositions R04 and R05; active zinc composition ZnX made by the wet process, in combination with a modified novolak resin) are markedly increased over a comparative system according the conventional technology (Rubber Composition R01; comprising resorcinol, a formaldehyde source, and cobalt stearate as accelerators for sulfur vulcanisation).

While fast vulcanisation has also been found when combining a standard zinc oxide (Red Seal ZnO made by the French process, having lower specific surface area than the active Zinc composition ZnX) with a urethane-aldehyde resin modified novolak resin in rubber composition R03, where an added cobalt salt (cobalt stearate) was also present, with even a higher maximum elastic stress S', drastically lower performance in both vulcanisation speed and maximum elastic stress S' was found without addition of cobalt stearate in the comparison composition R02. There is no such influence seen when comparing the results for rubber compositions R04 (without cobalt stearate) and R05 (with added cobalt stearate), when using the combination of active zinc composition ZnX made by the wet process and modified novolak resin, according to the invention. The addition of cobalt salt leads to a small drop in the maximum elastic stress S' in R05 as compared to R04. The vulcanisation speed remains at a high level.

Shore hardness tests reveal that the level reached with a resorcinol/cobalt salt reference system (R01) is maintained when using standard zinc oxide in combination with a special adhesion enhancement novolak system and a cobalt salt (R03), and also when using the active zinc composition ZnX in combination with a special adhesion enhancement novolak system according to the invention (R04), the combination of standard zinc oxide and a special adhesion enhancement novolak system (R02) has lower hardness. Addition of a cobalt salt to the system according to the invention (R05) leads to a slight reduction of the Shore hardness. Thus, a cobalt free formulation is preferable. Comparison of stress values at a given elongation of 100% shows the level of the resorcinol/cobalt salt reference system (R01) is improved by the system according to the invention (R04). Addition of cobalt salt to the latter system gives a further improvement (R05), but at the expense of having a cobalt salt containing system. Using conventional zinc oxide (R02, R03) leads to stress values lower (R02) and higher (R03) than those of the reference (R01). However, upon measurement of elastic stress at an elongation of 150%, the samples of R03 broke.

The measurement of the pull-out force (according to ASTM D 2229-02) reveals that the best results on ternary alloy-coated steel wire are obtained with the system according to the invention (R04), and that addition of cobalt salt to the system according to the invention decreases the pull-out force (R05). A similar effect of added cobalt salt, but on lower level, has been seen when using a standard zinc oxide grade in combination with a special adhesion enhancement and reinforcing novolak system (R02, R03).

The invention claimed is:

1. A rubber composition with enhanced curing and adhesion properties, comprising the following ingredients:
   R1 an elastomer or rubber E which is a diene-based elastomer selected from the group consisting of natural rubber NR, synthetic polyisoprene IR, butadiene rubber BR, and styrene-butadiene rubber SBR,
   R2 a particulate active filler which comprises carbon black, silica, or a combination of both,
   R3 a cobalt free curing or crosslinking or vulcanising system which includes sulphur, an active zinc composition ZnX having a specific surface area of from 10 $m^2/g$ to 100 $m^2/g$, and accelerators, wherein the active zinc composition comprises at least one of oxides, hydroxides, carbonates and basic carbonates of zinc, and has an average composition according to the general formula $Zn_xO_y(OH)_z(CO_3)_v$, wherein the indexes x, y, z, and v are integer and non-integer numbers in the following ranges: x=1 to 6, y=0 to 5, z=0 to 6, and v=0 to 5, with the requirement that more than one of y, z and v is greater than zero, and wherein the sum 2×x−2×y−z−2×v=0,
   R4 a novolak composition NC which is a mixture of a novolak resin PA and a urethane-aldehyde resin UA', and
   R5 a methylene donor.

2. The rubber composition as claimed in claim 1, wherein the active zinc composition ZnX is prepared by treating aqueous solutions of zinc salts with a soluble base or soluble carbonate salts from which a mixture of zinc carbonate or zinc hydroxide is precipitated, followed by a controlled and gentle drying step via spray drying or contact drying at temperatures of between 150° C. and 400° C.

3. The rubber composition as claimed in claim 1, wherein the gentle drying step is via spray drying at temperatures of between 150° C. and 400° C.

4. The rubber composition of claim 1, wherein the specific surface area of the active zinc composition ZnX is from 20 m²/g to 65 m²/g.

5. The rubber composition of claim 1, wherein the active zinc composition ZnX is in powder form.

6. The rubber composition of claim 1, wherein the active zinc composition ZnX is in the form of a masterbatch in a polymeric matrix, the latter being selected from the class of polyolefins, polyolefin copolymers with diencs, acrylates, esters and anhydrides of olefinically unsaturated acids, copolymerisable acetates of olefinically unsaturated acids, acrylonitrile, and polyesters, phenolic resins and amino resins, synthetic and natural rubber compounds, e.g. polyisoprene (IR), butadiene rubber (BR), styrene-butadiene rubber (SBR), ethylene-propylene diene rubber (EPDM), butylrubber (IIR), chloroprene rubber (CR), acrylonitrile butadiene rubber (NBR), all of the preceding rubber types being diene-based elastomers, polyurethane rubbers (polyesterurethane AU), polyetherurethane (EU), alkyl-acrylate copolymer rubber (ACM), hydrogenated acrylonitrile butadiene rubber (HNBR), chlorosulphonated polyethylene (CSM), vinylmethyl silicone rubber (VMQ), and phenylmethyl silicone rubber (PMQ), wherein the mass fraction w (ZnX) of active zinc composition ZnX in the masterbatch is from 5% to 80%, based on the mass of the masterbatch.

7. The rubber composition of claim 1, wherein the particulate filler R2 is selected from the group consisting of carbon black, silica aluminates, and hydrated and anhydrous silica, and from mixtures of these.

8. The rubber composition of claim 1, wherein the vulcanising system R3 comprises sulphur together with accelerators selected from the group consisting of thiazoles and sulfenamides and secondary accelerators selected from the group consisting of amine-aldehyde adducts, guanidines, thiurams, thioureas, and dithiocarbamates.

9. The rubber composition of claim 1, wherein the ratio m (ZnX)/$m_{R1}$ of the mass m (ZnX) of the active zinc composition ZnX in the rubber composition to the mass $m_{R1}$ of the elastomer component R1 is from 0.1 kg/(100 kg) [0.1 phr] to 10 kg/(100 kg) [10 phr].

10. The rubber composition of claim 9, wherein the ratio m (ZnX)/$m_{R1}$ of the mass m (ZnX) of the active zinc composition ZnX in the rubber composition to the mass $m_{R1}$ of the elastomer component R1 is from 0.4 phr to 8 phr.

* * * * *